(12) United States Patent
Nenner et al.

(10) Patent No.: US 9,756,528 B2
(45) Date of Patent: Sep. 5, 2017

(54) INDICATING ROUTING CAPACITY RELATED DATA OR ROUTING DELAY RELATED DATA VIA SIGNALLING MESSAGES IN A CORE NETWORK OF A TELECOMMUNICATIONS NETWORK USING DIAMETER MESSAGES

(71) Applicants: DEUTSCHE TELEKOM AG, Bonn (DE); T-MOBILE INTERNATIONAL AUSTRIA GMBH, Vienna (AT)

(72) Inventors: Karl Heinz Nenner, Bornheim (DE); Dieter Jacobsohn, Bonn (DE); Yvette Honorine Koza, Muehlleiten (AT)

(73) Assignees: DEUTSCHE TELEKOM AG, Bonn (DE); T-MOBILE INTERNATIONAL AUSTRIA GMBH, Vienna (AT)

( * ) Notice: Subject to any disclaimer, the term of this patent is extended or adjusted under 35 U.S.C. 154(b) by 65 days.

(21) Appl. No.: 14/773,387

(22) PCT Filed: Feb. 26, 2014

(86) PCT No.: PCT/EP2014/053693
§ 371 (c)(1),
(2) Date: Sep. 8, 2015

(87) PCT Pub. No.: WO2014/139794
PCT Pub. Date: Sep. 18, 2014

(65) Prior Publication Data
US 2016/0021574 A1    Jan. 21, 2016

(30) Foreign Application Priority Data

Mar. 15, 2013 (EP) .................................... 13159408

(51) Int. Cl.
*H04L 12/26* (2006.01)
*H04W 28/12* (2009.01)
(Continued)

(52) U.S. Cl.
CPC ............. *H04W 28/12* (2013.01); *H04L 45/24* (2013.01); *H04L 47/12* (2013.01); *H04L 45/124* (2013.01)

(58) Field of Classification Search
CPC .............................. H04L 45/304; H04L 45/52
See application file for complete search history.

(56) References Cited

U.S. PATENT DOCUMENTS

2010/0299451 A1   11/2010   Yigang et al.
2011/0202612 A1*   8/2011   Craig .................. H04L 63/0892
                                                                     709/206
(Continued)

FOREIGN PATENT DOCUMENTS

EP            2107725 A1    10/2009
WO    WO 2012075934 A1     6/2012

OTHER PUBLICATIONS

Roach Tekelec A B: "A Mechanism for Diameter Overload Control; draft-roach-dime-overload-ctrl-01.txt", A Mechanism for Diameter Overload Control; Draft-Roach-Dime-Overload-Ctrl-01.Txt, Internet Engineering Task Force, IETF; Standardworkingdraft, Internet Society (ISOC) 4, Rue Des Falaises CH-1205 Geneva, Switzerland, Oct. 22, 2012 (Oct. 22, 2012), pp. 1-38, XP015088407.

(Continued)

*Primary Examiner* — Shaq Taha
(74) *Attorney, Agent, or Firm* — Leydig, Voit & Mayer, Ltd.

(57) ABSTRACT

A method for indicating routing capacity related data or routing delay related data via signalling messages in a core network of a telecommunications network using Diameter messages of a Diameter protocol includes: transmitting a first piece of routing capacity related information from a first Diameter enabled network node to a second Diameter enabled network node, and transmitting a second piece of routing capacity related information from the first Diameter (Continued)

enabled network node to the second Diameter enabled network node. The first and second pieces of routing capacity related information are transmitted by at least one Diameter message, wherein the first piece of routing capacity related information comprises aggregated routing capacity data or aggregated routing delay data related to a first routing alternative, and the second piece of routing capacity related information comprises aggregated routing capacity data or aggregated routing delay data related to a second routing alternative.

12 Claims, 1 Drawing Sheet

(51) Int. Cl.
*H04L 12/707* (2013.01)
*H04L 12/801* (2013.01)
*H04L 12/721* (2013.01)

(56) References Cited

U.S. PATENT DOCUMENTS

| | | |
|---|---|---|
| 2011/0202676 A1 | 8/2011 | Craig et al. |
| 2012/0158994 A1* | 6/2012 | McNamee .............. H04L 41/12 709/238 |
| 2013/0183962 A1 | 7/2013 | Li et al. |

OTHER PUBLICATIONS

Korhonen Renesas Mobile H Tschofenig J et al: "The Diameter Overload Control Application (DOCA); draft-korhonen-dime-ovl-01.txt", The Diameter Overload Control Application (DOCA); Draft-Korhonen-Dime-Ovl-01.Txt, Internet Enginerring Task Force, IETF; Standardworkingdraft, Internet Society (ISOC) 4, Rue Des Falaises CH-1205 Geneva, Switzerland, Feb. 25, 2013 (Feb. 25, 2013), pp. 1-18, XP015092222.

* cited by examiner

INDICATING ROUTING CAPACITY RELATED DATA OR ROUTING DELAY RELATED DATA VIA SIGNALLING MESSAGES IN A CORE NETWORK OF A TELECOMMUNICATIONS NETWORK USING DIAMETER MESSAGES

CROSS-REFERENCE TO RELATED APPLICATIONS

This application is a U.S. National Phase application under 35 U.S.C. §371 of International Application No. PCT/EP2014/053693, filed on Feb. 26, 2014, and claims benefit to European Patent Application No. EP 13159408.7, filed on Mar. 15, 2013. The International Application was published in English on Sep. 18, 2014 as WO 2014/139794 under PCT Article 21(2).

FIELD

The present invention relates inter alia to a method for indicating routing capacity related data or routing delay related data via signalling messages in a core network of a telecommunications network using Diameter messages of a Diameter protocol, e.g. used as an AAA-protocol (authentication, authorization and accounting protocol) and/or as a mobility management protocol.

Furthermore, the present invention relates to a telecommunications network for indicating routing capacity related data or routing delay related data by means of Diameter messages of a Diameter protocol, as well as to a program comprising a computer readable program code and a computer program product.

BACKGROUND

In telecommunications network, especially public land mobile networks or telecommunications networks for mobile communication, typically signalling messages are to be transmitted between the various nodes of the telecommunications network, especially the core network of the telecommunications network. The core network corresponds to the backbone components of the (mobile) telecommunications network. The telecommunications network typically comprises—besides the core network—a radio access network, the radio access network being provided for ensuring that the (typically multitude of) user equipments that are using (or camping on) the telecommunications network are provided with a radio link or a plurality of radio links (uplink and/or downlink) such that the services requested by the user equipments can be delivered by the telecommunications network.

Within typical signalling networks—especially signalling networks within telecommunications networks, and especially within the core network of a mobile communication telecommunications network—messages, i.e. signalling messages, traverse a chain (or route) of network nodes (or signaling nodes) en route from the message originator (or client network node) to the message consumer (or server, also called target network node).

SUMMARY

In an embodiment, the present invention provides a method for indicating routing capacity related data or routing delay related data via signalling messages in a core network of a telecommunications network using Diameter messages of a Diameter protocol. The core network comprises a first Diameter enabled network node, a second Diameter enabled network node, a third Diameter enabled network node and a fourth Diameter enabled network node. According to a first routing alternative, a target network node is accessible to the first Diameter enabled network node via the third Diameter enabled network node, and, according to a second routing alternative, the target network node or a further target network node is accessible to the first Diameter enabled network node via the fourth Diameter enabled network node. The method includes: transmitting a first piece of routing capacity related information from the first Diameter enabled network node to the second Diameter enabled network node, and transmitting a second piece of routing capacity related information from the first Diameter enabled network node to the second Diameter enabled network node. The first and second pieces of routing capacity related information are transmitted by at least one Diameter message. The first piece of routing capacity related information comprises aggregated routing capacity data or aggregated routing delay data related to the first routing alternative, and the second piece of routing capacity related information comprises aggregated routing capacity data or aggregated routing delay data related to the second routing alternative.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
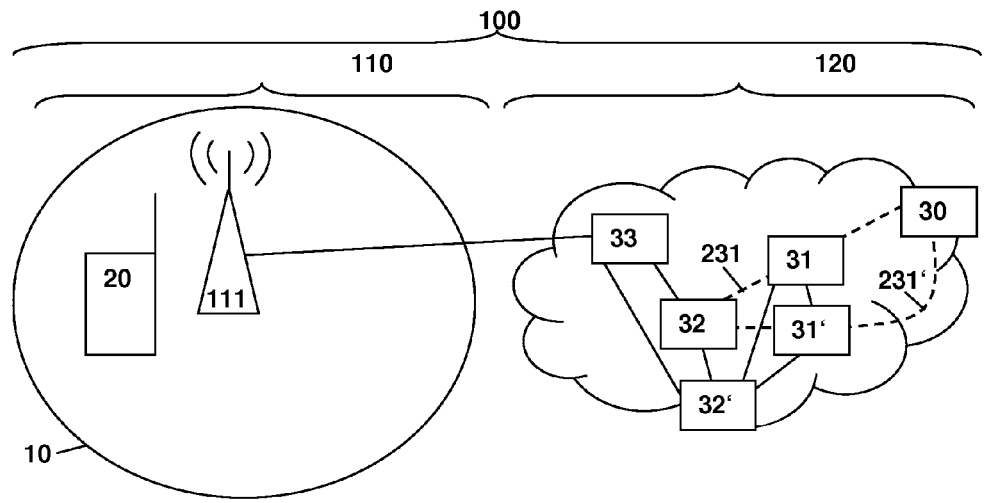
FIG. 1 schematically illustrates an example of a telecommunications network, comprising a core network and a radio access network, and a Diameter enabled signalling network being part of the core network.

The flow of such signalling messages through a telecommunications network (or signalling network thereof) needs to be assured according to network planning or network design targets. However, due to the sporadic nature of signalling load and the distribution of load during various times of the day (e.g. rather low typical load at night, and high load during the busy hour), it can happen at certain times that some network nodes of the signalling network encounter processing load and/or message handling load that is threatening to exceed their design limits (i.e., overload).

In addition, failures of the (communication links of the) transmission network or failures of a certain (or a plurality of) signaling network node can render the message transfer via this transmission link or this network node impossible. This may then cause overload in other network nodes in the chain—especially such network nodes that are located upstream (or earlier) of the failed network node with respect to the direction of the concerned message flow—as such upstream (or earlier) network node are no longer able to finish to proceed outstanding requests (i.e. signalling messages) while new requests (i.e. further signalling messages) keep coming in.

In the context of the Third Generation Partnership Project (3GPP), attempts have already been made regarding solutions for such overload situations in Diameter signalling networks.

However these solutions do not provide an end to end solution such that in the event that a signaling network node or a transmission link en route between the client and the server (including the server itself) becomes overloaded—or risks to get overloaded in a subsequent time interval—this situation is addressed and handled by the signalling network in a way that the consequences of such an overload situation are—as much as possible—reduced locally in the telecommunications network, especially in a prospective manner.

In an embodiment, the invention provides a method for indicating routing capacity related data or routing delay related data via signalling messages in a core network of a telecommunications network using Diameter messages of a Diameter protocol such that network overload situations can be reduced and thus fixed costs as well as operational costs can be reduced, and nevertheless the service level of a user of the mobile telecommunications network preserved even during peak time periods or heavy usage of the telecommunications network.

In an embodiment, the invention provides a method for indicating routing capacity related data or routing delay related data via signalling messages in a core network of a telecommunications network using Diameter messages of a Diameter protocol, wherein the core network comprises a first Diameter enabled network node, a second Diameter enabled network node, and at least a third Diameter enabled network node and a fourth Diameter enabled network node, wherein—according to a first routing alternative—a target network node is able to be accessed, by the first Diameter enabled network node, via the third Diameter enabled network node, and—according to a second routing alternative—the target network node or a further target network node is able to be accessed, by the first Diameter enabled network node, via the fourth Diameter enabled network node, wherein the method comprises the following steps:

a first piece of routing capacity related information is transmitted from the first Diameter enabled network node to the second Diameter enabled network node, and a second piece of routing capacity related information is transmitted from the first Diameter enabled network node to the second Diameter enabled network node, wherein the first and second piece of routing capacity related information is transmitted by at least one Diameter message, wherein the first piece of routing capacity related information comprises aggregated routing capacity data or aggregated routing delay data related to the first routing alternative, and wherein the second piece of routing capacity related information comprises aggregated routing capacity data or aggregated routing delay data related to the second routing alternative.

According to the present invention it is thereby advantageously possible, that network resources can be used more efficiently and thus a higher capacity in handling signalling messages provided by the telecommunications network.

According to the present invention, it is possible to not only address overload issues within a signalling telecommunications network with respect to certain specific use cases but to provide an end to end solution for the handling of actual overload situations (or situations of actual reduced capacity) and/or anticipated overload situations (or situations of anticipated reduced capacity) within at least a part of the signalling network.

According to the present invention, it is advantageously possible that in the situation that a message that is to be routed from an originator network node of the message to a target network node, and the message is alternatively able to be routed via a plurality of routes or routing alternatives within the telecommunications network (i.e. the message can be transmitted (alternatively) on a plurality of different possible paths in the form of successions of network nodes of the telecommunications network (or hops) through which the message is transmitted), the network nodes of the telecommunications network are able to dynamically transmit information regarding the routing capacity and/or the routing delay associated with the different possible paths of the message through the telecommunications network such that such routing capacity related data and/or routing delay related data can be taken into consideration comparably early (regarding the time span a message needs to being transmitted through the telecommunications network from the originator network node to the target network node. According to the present invention, it is advantageously possible that information regarding the routing capacity and/or regarding the routing delay of certain possible alternative paths (or routing alternatives) through the telecommunications network is able to be transmitted in aggregated form, i.e. concerning the complete residual path or routing alternative, starting from the network node (first network node) evaluating and/or aggregating the routing capacity related data and/or routing delay related data until the target network node.

For example, it is advantageously possible according to the present invention that a situation of increased load and/or of reduced capacity (that is either actually realized at a given point in time or that is only expected regarding a point in time in the future) of a specific network node within the telecommunications network is communicated dynamically and in a self-organizing manner to other network nodes, especially those that are located upstream (from the specific network node) regarding the message flow direction from an originator network node of messages towards target network node or nodes. Thereby, it is advantageously possible that not only immediately neighbouring network nodes of the telecommunications network (with respect to the specific network) are informed about the (present or future) situation of increased load and/or of reduced capacity but also network nodes that are potentially located far away within the telecommunications network.

The present invention primarily relates to Diameter messages, i.e. signalling messages according to the Diameter protocol, and to a telecommunications network having network nodes that are Diameter enabled, i.e. prepared to communicate with each other according to the Diameter protocol.

In the context of the present invention and regarding different network nodes, the following terminology is adopted: A Diameter message, typically a request message (but also an answer message), is originally generated (within the Diameter enabled telecommunications network) by an originator network node (or client network node; however, the originator network node does not need to be a client network node, i.e. generating typically a request message). Typically, the Diameter message passes a plurality of network nodes or hops. For the purpose of describing the present invention and according to a simplified example of a telecommunications network, the originator network node is also called the second network node. The first hop of the Diameter message starting from the originator network node (or second network node) is towards a Diameter enabled network node which is also called the first network node. From the Diameter enabled first network node, the Diameter message can take (e.g.) either a first route (or first routing alternative), via a third network node to the target network node, or a second route (or second routing alternative), via a fourth network node to the target network node. According to the inventive method of the present invention, the first network node transmits routing capacity related information to the second network node in view of thereby potentially influencing the behaviour of the second network node (which is located upstream from the target network node perspective). This principle of transmitting routing capacity related information from a first network node (located downstream with respect to the direction of flow of the message) towards a second network node (located typically directly upstream from the first network node with respect to the direction of flow of the message) can be applied to—in principle—all network nodes of the telecommunications network and/or to all Diameter messages within the telecommunications network or the Diameter network. The routing capacity related information can be understood as a kind of watermark indication about the load situation in the telecommunications network or in the network of Diameter network nodes or in certain parts (or along certain routes) thereof. The routing capacity related information can be integrated both in Diameter request messages as well as in Diameter answer/response messages. The routing capacity related information or load level indication typically allows a network node that receives the routing capacity related information (i.e. in the terminology according to the present invention the second network node that receives the routing capacity related information from the first network node) to deduce whether the network node that sends the routing capacity related information (i.e. in the terminology according to the present invention the first network node) is able to receive (further or future) messages or not, and whether its message load could or should be increased or should be reduced.

The originator network node is only the originator of the Diameter message within the Diameter enabled telecommunications network but does not need to be (and in most cases will not be) the logical originator of the event that triggers the considered Diameter message. For example, in many cases the event that causes a Diameter enabled network node (or client network node or originator network node) to send a signaling message may originate from a node outside of the signaling network, e.g. a mobile terminal requesting network attach from an MME entity (Mobility Management Entity) of the mobile telecommunications network, causing the MME entity (as part of the Diameter enabled signalling network) to issue (i.e. to originate and thereby acting as the Diameter enabled client entity) a Diameter signaling request (i.e. a Diameter message) towards a HSS entity (Home Subscriber Server) of the mobile telecommunications network. In the event of a failure scenario of the signalling network, the MME entity will not succeed in forwarding the signaling Diameter message towards the HSS entity.

It is furthermore advantageous according to the present invention that the routing capacity related information can be transmitted from the first network node to the second network node on the application layer, i.e. layer 7 of the OSI (Open Systems Interconnection) model.

According to the present invention, it is preferred that the first piece of routing capacity related information is transmitted by the at least one Diameter message via at least a first Attribute-Value-Pair and/or wherein the second piece of routing capacity related information is transmitted by the at least one Diameter message via at least a second Attribute-Value-Pair.

Thereby it is advantageously possible, that the routing capacity related information can be easily transmitted from the first network node to the second network node.

The message content of typical Diameter messages, such as network attach requests within mobile telecommunications networks or the like, is such that the additional transmission payload for transmitting the routing capacity related information is typically negligible, e.g. of the order of magnitude of less than one percent or at most 5%, especially in case that the routing capacity related information comprised in a Diameter message relates to the same routing alternative that is also intended for the Diameter message concerned.

Furthermore, it is preferred according to the present invention that the first piece of routing capacity related information, and/or the second piece of routing capacity related information indicates an overload situation of at least one of the first, third or fourth network node,
wherein the first piece of routing capacity related information and the second piece of routing capacity related information, respectively, preferably indicates one or a plurality out of the following:

the number of estimated requests per a predefined time interval or the rate of estimated requests, preferably associated with a specific type or application, that the respective routing alternative is able to bear, the estimated occupied load ratio, preferably associated with a specific type or application, that the respective routing alternative has to bear, the estimated unoccupied load ratio, preferably associated with a specific type or application, that the respective routing alternative is able to bear, the estimated delay, preferably associated with a specific type or application, that it takes on the respective routing alternative to process the request by the target network node or the further target network node, respectively.

Thereby, it is advantageously possible according to the present invention that the routing capacity related information can be used in a flexible and variable manner.

Still furthermore, it is preferred according to the present invention that the at least one Diameter message corresponds to an answer message related to at least one Diameter request message, wherein the at least one Diameter request message is related to a communication event originated at the second Diameter enabled network node and directed to the target network node or to the further target network node.

Thereby, it is advantageously possible according to the present invention, that the additional overhead for transmitting the routing capacity related information can be considerably reduced as, typically, no additional Diameter messages need to be generated just for transmitting the routing capacity related information, but existing Diameter messages that would have been sent anyway are also used to transmit the routing capacity related information.

According to an alternative embodiment of the present invention, the at least one Diameter message corresponds to a watchdog type message between the first Diameter enabled network node and the second Diameter enabled network node, or an explicit routing capacity related or routing delay related type of message between the first Diameter enabled network node and the second Diameter enabled network node.

According to yet another embodiment of the present invention, it is preferred that a subsequent Diameter request message is sent by the second Diameter enabled network node in dependency of the first and/or second piece of routing capacity related information.

Thereby, it is advantageously possible according to the present invention that subsequent routing decisions, taken by the second network node, are altered in view of routing capacity related information transmitted by the first network node towards the second network node. Therefore, in case that a signaling node or a transmission link en route between the client network node (or originator network node) and the server network node (i.e. the target network node), including the server network node itself, becomes overloaded, the previous (i.e. upstream) network nodes in the transmission chain (or routing alternative) should reduce the load on the overloaded system.

Furthermore, it is preferred according to the present invention that the first piece of routing capacity related information is associated with a first validity time interval and/or the second piece of routing capacity related information is associated with a second validity time interval, wherein after the expiration of the first validity time interval, preferably a subsequent first piece of routing capacity related information is to be sent to the second Diameter enabled network node and/or after the expiration of the second validity time interval, preferably a subsequent second piece of routing capacity related information is to be sent to the second Diameter enabled network node, wherein preferably the first validity time interval is transmitted to the second Diameter enabled network node via a third Attribute-Value-Pair and/or the second validity time interval is transmitted to the second Diameter enabled network node via a fourth Attribute-Value-Pair.

According to this further embodiment of the present invention, it is advantageously possible that the first network node provides information to the second network node in an effective manner, e.g. without the need to re-transmit the (first and/or second) routing capacity related information during the (first and/or second) validity time interval.

According to a further embodiment of the present invention, it is preferred that in case that the aggregated routing capacity data or aggregated routing delay data, compared to the first routing capacity related information, indicate a non-negligible change, a subsequent first piece of routing capacity related information is sent to the second Diameter enabled network node, and/or wherein in case that the aggregated routing capacity data or aggregated routing delay data, compared to the second routing capacity related information, indicate a non-negligible change, a subsequent second piece of routing capacity related information is sent to the second Diameter enabled network node.

Thereby, it is advantageously possible to flexibly adapt the routing capacity related information (and the intended reactions of neighbouring network nodes) according to the communication needs.

The present invention also relates to a telecommunications network for indicating routing capacity related data or routing delay related data via Diameter messages of a Diameter protocol as signalling messages that are routed in a core network of the telecommunications network, wherein the core network comprises a first Diameter enabled network node, a second Diameter enabled network node, and at least a third Diameter enabled network node and a fourth Diameter enabled network node, wherein—according to a first routing alternative—a target network node is able to be accessed, by the first Diameter enabled network node, via the third Diameter enabled network node, and—according to a second routing alternative—the target network node or a further target network node is able to be accessed, by the first Diameter enabled network node, via the fourth Diameter enabled network node,
wherein the telecommunications network is configured such that:

a first piece of routing capacity related information is transmitted from the first Diameter enabled network node to the second Diameter enabled network node, and a second piece of routing capacity related information is transmitted from the first Diameter enabled network node to the second Diameter enabled network node, wherein the telecommunications network is furthermore configured such that the first and second piece of routing capacity related information is transmitted by at least one Diameter message, wherein the first piece of routing capacity related information comprises aggregated routing capacity data or aggregated routing delay data related to the first routing alternative, and the second piece of routing capacity related information comprises aggregated routing capacity data or aggregated routing delay data related to the second routing alternative.

Thereby it is advantageously possible according to the present invention to provide an enhance network capacity and a more flexible adaption to different load situations of the telecommunications network. It is to be understood that the preferred embodiments according to the inventive method also apply to the inventive telecommunications network.

Furthermore, the present invention relates to a program comprising a computer readable program code which, when executed on a computer or on a network node of a core network of a telecommunications network, causes the computer or the network node of the core network of the telecommunications network to perform the inventive method.

The present invention also relates to computer program product for using a core network of a telecommunications network, the computer program product comprising a computer program stored on a storage medium, the computer program comprising program code which, when executed on a computer or on a network node of the core network of the telecommunications network, causes the computer or the network node of the core network of the telecommunications network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, as an example of a telecommunications network 100 is schematically shown, the mobile communication network 100 comprising a radio access network 110 and a core network 120. The mobile communication network 100 is preferably a cellular telecommunications network comprising typically a plurality of network cells, one of which is represented in FIG. 1 by means of a solid line and reference sign 10. In the mobile communication network 100, typically a plurality of user equipments are camping on the telecommunications network 100 within the network cell 10, i.e. the user equipments and/or machine type communication devices are connected or are camping on a base station 111 serving the cell 10. The base station 111 is typically a base station, e.g. BTS (base transceiver station), NodeB or an eNodeB base station. A user equipment 20 is schematically represented by means of reference sign 20.

The core network 120 of the telecommunications network 100 comprises a plurality of Diameter enabled network nodes. A first network node 32 is connected with a second network node 33. A further first network nod 32' is also connected with the second network node 33. Typically, also the first network node 32 and the further first network node 32' are connected. A target network node is represented by reference sign 30. From the first network node 32 towards the target network node 30, the telecommunications network 100, i.e. the core network 120 or the Diameter enabled network, comprises a first routing alternative 231 (from the first network node 32 via a third network node 31 to the target network node 30) and a second routing alternative 231' (from the first network node 32 via a fourth network node 31' to the target network node 30). Likewise, the further first network node 32' is connected to the target network node 30 either via third network node 31 or via the fourth network node 31'. The first and second routing alternative from the first network node 32 towards the target network node 30 is exemplarily represented by reference sign 231 and 231', respectively, and by means of a bold dashed line.

The representation of FIG. 1 aims at representing an exemplary configuration of a signalling network as part of the core network 120 of the telecommunications network 100. In this exemplary configuration of the signalling network, the second network node 33 serves as an entry point from the radio access network 110. Towards the target network node 30, a Diameter message needs to travel (or to hop) via the first network node 32, and either via the third network node or via a fourth network node. In case of reduced capacity, e.g. of the third network node 31, the first network node 32 sends a routing capacity related information to the second network node 33 such that for a subsequent Diameter message of the second network node (e.g. directed to the target network node 30) the routing capacity related information can be taken into consideration whether to route the Diameter message either via the first network node 32 and via the third network node 31, or via the first network node 32 and via the fourth network node 31', or via the further first network node 32' and via the third network node 31, or via the further first network node 32' and via the fourth network node 31'.

Figure 2:
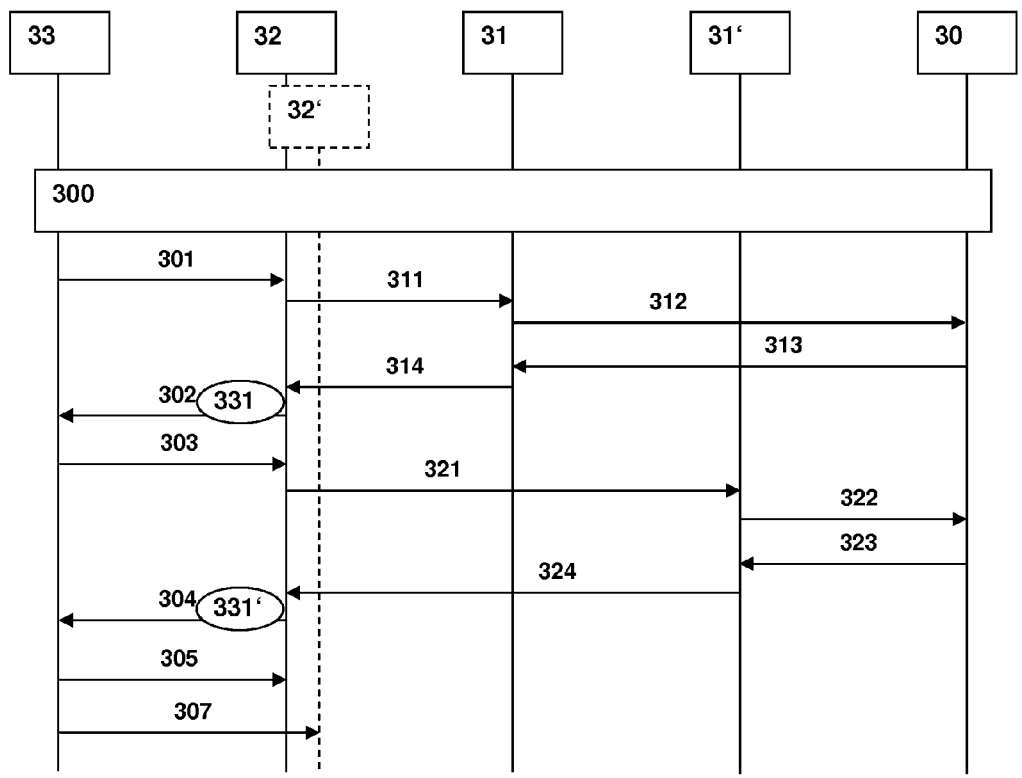
FIG. 2 schematically illustrates a communication diagram between an originating network node (or client network node) and a target network (or server network node) node in a signalling telecommunications network, wherein a first routing alternative and a second routing alternative are possible between the originating network node and the target network node.

In FIG. 2, a communication diagram between an originating network node (or client network node, also called the second network node 33) and a target network node 30 (or server network node) in a signalling telecommunications network is schematically shown, wherein a first routing alternative (via the third network node 31) and a second routing alternative (via the fourth network node 31') are possible between the originating network node 33 and the target network node 30.

During an initiation step 300, the network nodes 33, 32, 32', 31, 31', 30 concerned conduct a discovery procedure such that Diameter messages can be exchanged and transmitted.

In a first step, using the first routing alternative 231, the second network node 33 sends a first message 301 to the first network node 31. The first message 301 is a Diameter message and consists, e.g., in an attachment request of a user equipment. In response to the first message 301, a second message 311 is transmitted by the first network node 32 towards the third network node 31. In response to the second message 311, a third message 312 is transmitted by the third network node 31 towards the target network node 30. The target network node 30 answers the third message 312 via a fourth message 313 directed to the third network node 31. In response to the fourth message 313, a fifth message 314 is transmitted by the third network node 31 towards the first network node 32. Based on information and data obtained from other network nodes and/or from local measurements (especially delay time measurements), the first network node 32 generates first piece of routing capacity related information 331 (related to the first routing alternative 231) to be added to a sixth Diameter message 302 and transmitted to the second network node 33 in reply to the first Diameter message 301.

In a second step, using the second routing alternative 231', the second network node 33 sends a seventh message 303 to the first network node 31. The seventh message 303 is a Diameter message and may be, e.g., in an attachment request of a user equipment. In response to the seventh message 303, an eighth message 321 is transmitted by the first network node 32 towards the fourth network node 31'. In response to the eighth message 321, a ninth message 322 is transmitted by the fourth network node 31' towards the target network node 30. The target network node 30 answers the ninth message 322 via a tenth message 323 directed to the fourth network node 31'. In response to the tenth message 323, an eleventh message 324 is transmitted by the fourth network node 31' towards the first network node 32. Based on information and data obtained from other network nodes and/or from local measurements (especially delay time measurements), the first network node 32 generates second piece of routing capacity related information 331' (related to the second routing alternative 231') to be added to a twelfth Diameter message 304 and transmitted to the second network node 33 in reply to the seventh Diameter message 303.

In the example of FIG. 2, the first piece of routing capacity related information 331 (related to the first routing alternative 231) is transmitted with a Diameter message (sixth Diameter message 302) related to the first step, i.e. being related to using the first routing alternative 231, and the second piece of routing capacity related information 331' (related to the second routing alternative 231') is transmitted with a Diameter message (twelfth Diameter message 304) related to the second step, i.e. being related to using the second routing alternative 231'. However, this does not necessarily be the case in each situation, i.e. it may well be the case that a piece of routing capacity related information (related with a specific routing alternative) is transmitted (or a plurality of pieces of routing capacity related information are transmitted) in a Diameter message that is related to another routing alternative.

Via the first piece of routing capacity related information 331 and/or the second piece of routing capacity related information 331', the routing decisions and/or the routing preferences being comprised in a subsequent thirteenth message 305 from the second network node 33 to the first network node 32 (or a subsequent fourteenth message 307 from the second network node 33 to the further first network node 32') are able to be modified such that the network performance is enhanced and the number of failure messages is reduced.

Preferably, the first piece of routing capacity related information 331 and/or the second piece of routing capacity related information 331' are transmitted by the sixth Diameter message 302 and/or the twelfth Diameter message 304. The first piece of routing capacity related information 331 is preferably transmitted via a first Attribute-Value-Pair and the second piece of routing capacity related information 331' is preferably transmitted via a second Attribute-Value-Pair. According to the present invention, both the first and the second piece of routing capacity related information 331, 331' can also be transmitted in the same Diameter message (such as the sixth Diameter message 302 or the twelfth Diameter message 304), especially in case that a (sufficiently strong) change of the message handling capacity has occurred since the last transmission of the first or second piece of routing capacity related information 331, 331'.

Regarding the content of the first and/or second piece routing capacity related information 331, 331', it is preferred that the first piece of routing capacity related information 331, and/or the second piece of routing capacity related information 331' indicates an overload situation of at least one of the first, third or fourth network nodes 32, 31, 31', wherein the first piece of routing capacity related information 331 and the second piece of routing capacity related information 331', respectively, preferably indicates one or a plurality out of the following:

the number of estimated requests per a predefined time interval or the rate of estimated requests, preferably associated with a specific type or application, that the respective routing alternative is able to bear, the estimated occupied load ratio, preferably associated with a specific type or application, that the respective routing alternative has to bear, the estimated unoccupied load ratio, preferably associated with a specific type or application, that the respective routing alternative is able to bear, the estimated delay, preferably associated with a specific type or application, that it takes on the respective routing alternative to process the request by the target network node (30) or the further target network node, respectively.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for indicating routing-related data in a core network of a telecommunications network using Diameter messages of a Diameter protocol, wherein the core network comprises a first Diameter-enabled network node, a second Diameter-enabled network node, a third Diameter-enabled network node and a fourth Diameter-enabled network node, wherein, according to a first routing alternative, a target network node is accessible to the first Diameter-enabled network node via the third Diameter-enabled network node, and, according to a second routing alternative, the target network node or a further target network node is accessible to the first Diameter-enabled network node via the fourth Diameter-enabled network node, wherein the method comprises:

transmitting a first Diameter message comprising a first piece of routing-related information from the first Diameter-enabled network node to the second Diameter-enabled network node, wherein the first piece of routing-related information comprises aggregated routing capacity data or aggregated routing delay data related to the first routing alternative;

transmitting a second Diameter message comprising a second piece of routing-related information from the first Diameter-enabled network node to the second Diameter-enabled network node, wherein the second piece of routing-related information comprises aggregated routing capacity data or aggregated routing delay data related to the second routing alternative; and receiving, by the first Diameter-enabled network node or a further first Diameter-enabled network node, a message from the second Diameter-enabled network node comprising routing decisions and/or routing preferences modified based on the first piece of routing-related information and/or the second piece of routing-related information so as to enhance network performance and reduce failure.

2. The method according to claim 1, wherein the first piece of routing-related information is transmitted via at least a first Attribute-Value-Pair and/or wherein the second piece of routing-related information is transmitted via at least a second Attribute-Value-Pair.

3. The method according to claim 1, wherein the first piece of routing-related information and/or the second piece of routing-related an overload situation of at least one of the first, third or fourth network nodes.

4. The method according to claim 1, wherein the first Diameter message corresponds to an answer message related to a Diameter request message, wherein the first Diameter request message is related to a communication event originated at the second Diameter-enabled network node and directed to the target network node or to the further target network node.

5. The method according to claim 1, wherein the first Diameter message corresponds to:
   a watchdog type message between the first Diameter-enabled network node and the second Diameter-enabled network node, or
   an explicit routing capacity-related or routing delay-related type of message between the first Diameter-enabled network node and the second Diameter-enabled network node.

6. The method according to claim 1, wherein a subsequent Diameter request message is sent by the second Diameter-enabled network node based on the first and/or second pieces of routing-related information.

7. The method according to claim 1, wherein the first piece of routing-related information is associated with a first validity time interval and/or the second piece of routing-related information is associated with a second validity time interval.

8. A telecommunications network for indicating routing-related data via Diameter messages of a Diameter protocol in a core network of the telecommunications network, wherein the telecommunications network comprises:
   a core network, the core network comprising: a first Diameter-enabled network node, a second Diameter-enabled network node, a third Diameter-enabled network node and a fourth Diameter-enabled network node; and
   a target network node and/or a further target network node, wherein, according to a first routing alternative, the target network node is accessible to the first Diameter-enabled network node via the third Diameter-enabled network node, and, according to a second routing alternative, the target network node or the further target network node is accessible to the first Diameter-enabled network node via the fourth Diameter-enabled network node;
   wherein the first Diameter-enabled network node is configured to:
      transmit a first Diameter message comprising a first piece of routing-related information to the second Diameter-enabled network node, wherein the first piece of routing-related information comprises aggregated routing capacity data or aggregated routing delay data related to the first routing alternative; and
      transmit a second Diameter message comprising a second piece of routing-related information to the second Diameter-enabled network node, wherein the second piece of routing-related information comprises aggregated routing capacity data or aggregated routing delay data related to the second routing alternative; and
   wherein the second Diameter-enabled network node is configured to transmit, to the first Diameter-enabled network node or a further first Diameter-enabled network node, a message comprising routing decisions and/or routing preferences modified based on the first piece of routing-related information and/or the second piece of routing-related information so as to enhance network performance and reduce failure.

9. The method according to claim 3, wherein the first piece of routing-related information and the second piece of routing-related information respectively indicate one or a plurality of the following:
   the number of estimated requests per a predefined time interval or the rate of estimated requests that the respective routing alternative is able to bear;
   the estimated occupied load ratio that the respective routing alternative has to bear;
   the estimated unoccupied load ratio that the respective routing alternative is able to bear;
   the estimated delay that it takes on the respective routing alternative to process the request by the target network node or the further target network node, respectively.

10. The method according to claim 7, wherein after the expiration of the first validity time interval, a subsequent first piece of routing-related information is to be sent to the second Diameter-enabled network node and/or after the expiration of the second validity time interval, a subsequent second piece of routing-related information is to be sent to the second Diameter-enabled network node.

11. The method according to claim 7, wherein the first validity time interval is transmitted to the second Diameter-enabled network node via a third Attribute-Value-Pair and/or the second validity time interval is transmitted to the second Diameter-enabled network node via a fourth Attribute-Value-Pair.

12. One or more non-transitory, processor-readable media having processor-executable instructions stored thereon for indicating routing-related data in a core network of a telecommunications network using Diameter messages of a Diameter protocol, wherein the core network comprises a first Diameter-enabled network node, a second Diameter-enabled network node, a third Diameter-enabled network node and a fourth Diameter-enabled Diameter network node, wherein, according to a first routing alternative, a target network node is accessible to the first Diameter-enabled network node via the third Diameter-enabled network node, and, according to a second routing alternative, the target network node or a further target network node is accessible to the first Diameter-enabled network node via the fourth Diameter-enabled network node, wherein the processor-executable instructions, when executed by one or more processors, facilitate performance of the following steps:
   transmitting a first Diameter message comprising a first piece of routing-related information from the first Diameter-enabled network node to the second Diameter-enabled network node, wherein the first piece of routing-related information comprises aggregated routing capacity data or aggregated routing delay data related to the first routing alternative;
   transmitting a second Diameter message comprising a second piece of routing-related information from the first Diameter-enabled network node to the second Diameter-enabled network node, wherein the second piece of routing-related information comprises aggregated routing capacity data or aggregated routing delay data related to the second routing alternative; and
   receiving, by the first Diameter-enabled network node or a further first Diameter-enabled network node, a message from the second Diameter-enabled network node comprising routing decisions and/or routing preferences modified based on the first piece of routing-related information and/or the second piece of routing-related information so as to enhance network performance and reduce failure.

* * * * *